W. R. H. CAPEWELL.
CAR COUPLING.
APPLICATION FILED SEPT. 11, 1912.
1,077,592.
Patented Nov. 4, 1913.
2 SHEETS—SHEET 1.
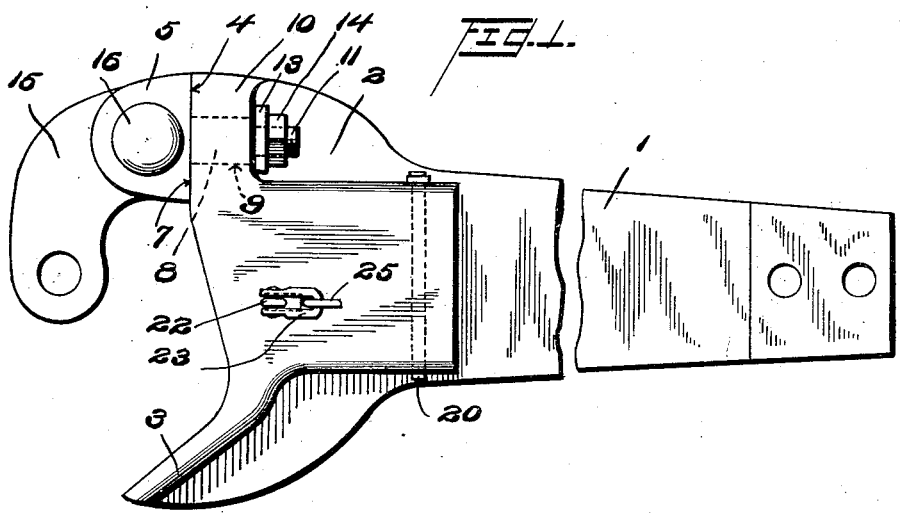
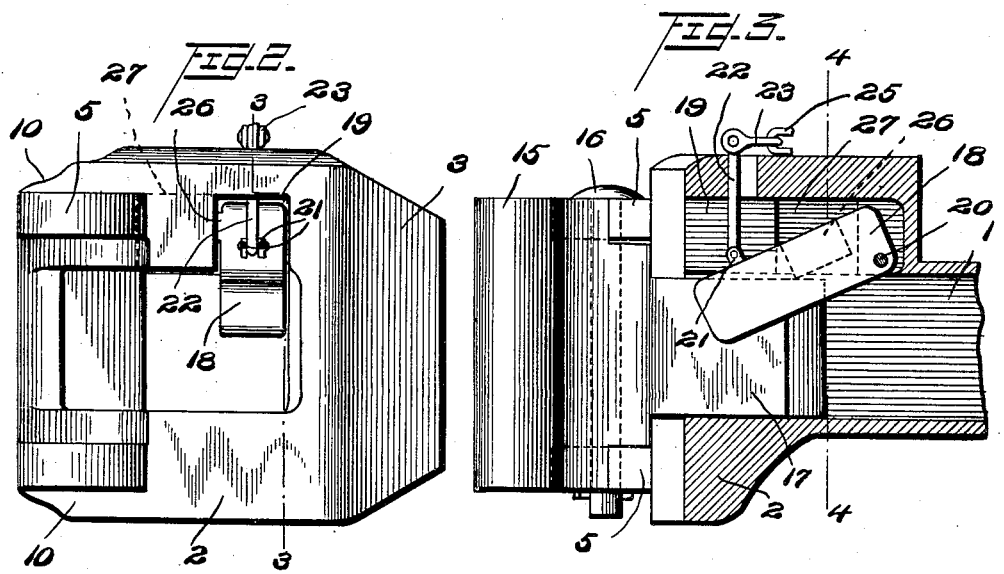
Witnesses
H. Strauss
R. N. Krenkel
Inventor
William R. H. Capewell
By Joshua R. H. Potts
Attorney

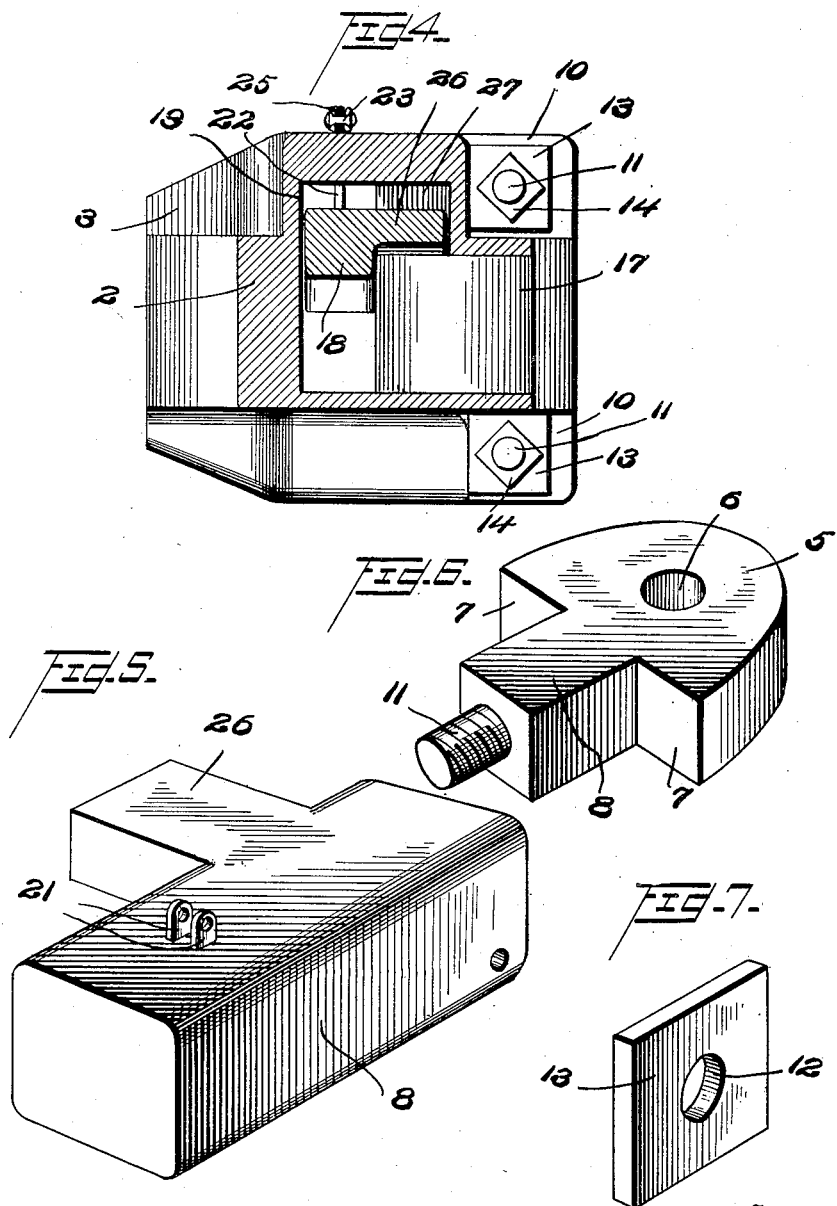

UNITED STATES PATENT OFFICE.

WILLIAM R. H. CAPEWELL, OF JAMESBURG, NEW JERSEY.

CAR-COUPLING.

1,077,592.

Specification of Letters Patent.

Patented Nov. 4, 1913.

Application filed September 11, 1912. Serial No. 719,734.

*To all whom it may concern:*

Be it known that I, WILLIAM R. H. CAPEWELL, a citizen of the United States, residing at Jamesburg, in the county of Middlesex and State of New Jersey, have invented certain new and useful Improvements in Car-Couplings, of which the following is a specification.

My invention relates to improvements in car couplings, the object of the invention being to provide an improved construction of coupling head having separable ears receiving the pivot pin of the knuckle, so that in the event one of these ears should break, it can be replaced without discarding the coupling.

A further object is to provide a coupling head which is capable of use in connection with any of the well known types of knuckle in general use.

Couplings as ordinarily made are provided with ears which are integral with the head. These ears frequently break, and necessitate the discarding of the entire coupling. The knuckles of car couplings also break, and as there are many different types of coupling in general use with knuckles of a special make to fit such couplings, when such knuckles break, it is necessary to find a like knuckle for the coupling, necessitating a large variety of knuckles to be kept in stock or else the repair of the car delayed.

It is the purpose of my invention to provide a coupling which has removable or separable ears so that in the event of the breakage of one or both of the ears, they may be replaced and also to provide a car coupling with a head and locking means of a construction which permits the use of any of the well known types of knuckle in general use.

With these and other objects in view, the invention consists in certain novel features of construction and combinations and arrangements of parts as will be more fully hereinafter described and pointed out in the claims.

In the accompanying drawings: Figure 1 is a broken plan view illustrating my improvements. Fig. 2 is an end view of the head with the knuckle removed. Fig. 3 is a view in longitudinal section on the line 3—3 of Fig. 2 but showing the knuckle in place. Fig. 4 is a view in transverse section on the line 4—4 of Fig. 3. Fig. 5 is a detail perspective view of the locking block. Fig. 6 is a detail perspective view of one of the ears, and Fig. 7 is a similar view of the washer.

My improved car coupling comprises a draw bar 1 having an integral head 2, and this draw bar and head may be made of various dimensions and shapes but in accordance with the requirements of the Master Car-Builders' regulations, hence the invention is not limited to the particular formation of these parts except in so far as they refer to the structure to be hereinafter described. The head 2 has the ordinary rigid jaw 3 at one side and on the opposite side is provided with a flat face 4 against which removable ears 5 are secured. These ears 5 are in the form of blocks with central openings 6, and said blocks at one end have flat faces 7 which bear against the flat face 4 of the head.

Integral angular extensions 8 are provided on the ears which are positioned in the angular openings 9 in integral enlargements 10 on the upper and lower portions of the head. The free ends of these extensions 8 are provided with cylindrical screw-threaded lugs 11 which are projected through openings 12 in angular washer plates 13 and nuts 14 are screwed onto the lugs against the plates. By reason of such a construction, the ears are rigidly secured to the head and are held against any turning movement and they are adapted to receive the knuckle 15 between them, said knuckle being pivotally supported by the ordinary pin 16.

The knuckle, as is customary, is provided with a tail 17 which swings into the head, and this tail is locked against movement by my improved locking block 18. The block 18 is positioned in a recess 19 in the top of the head, and is pivotally connected at one end to the head by means of a transverse pin 20. This block 18 is provided with perforated lugs 21 which are connected by a link 22 with a clevis 23 on top of the head, and through the medium of a chain 25 said block is adapted to be elevated to release the knuckle tail. The block 18 is provided with an integral lateral extension 26 which is movable in a transverse recess 27 in the head, and this extension 26 normally rests upon the upper face of the knuckle tail and holds the block in its normal locking position. By means of a locking mechanism of this kind, any ordinary form of knuckle having a tail may be used in connection with the head, hence, if the knuckle breaks, any ordinary knuckle may be placed in position in the head and the coupling will be ready for use. Such a structure therefore does not require a particular knuckle but is capable of use with any of the well known forms of knuckle. The block when elevated moves into the recesses 19 and 27 and is out of the way of the tail of the knuckle, so that knuckles having tails of various shapes may be swung into the head and when the block falls, will be securely held against upward movement.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A car coupling comprising a head having enlargements at top and bottom, said enlargements having flat front faces, and openings extending through the same longitudinally of the coupling, ears having flat surfaces positioned against the enlargements, and integral extensions on said ears secured within the openings in the enlargements, substantially as described.

2. A car coupling comprising a head having enlargements at top and bottom, said enlargements having flat front faces, and openings extending through the same longitudinally of the coupling, ears having flat surfaces positioned against the enlargements, and integral extensions on said ears projected through the openings in the enlargements, devices securing the extensions in the enlargements, and said openings and said extensions angular in cross section, substantially as described.

3. A car coupling comprising a head having enlargements on its top and bottom at one side, said enlargements having flat faces and openings therethrough, ears positioned against the flat face of the head, extensions on the ears projected through the openings, and means on the rear face of the enlargements securing the extensions in the openings, substantially as described.

4. A car coupling comprising a head having enlargements on its top and bottom at one side, said enlargements having flat faces and angular openings therethrough, ears having flat faces positioned against the flat faces of the enlargements, angular extensions on said ears positioned in the angular openings of the enlargements, cylindrical integral screw-threaded studs on the ends of said extensions, angle plates having openings therein through which the lugs are projected, and nuts on the lugs pressing the angle plates against the rear faces of the enlargements, substantially as described.

In testimony whereof I have signed my name to this specification in the presence of two subscribing witnesses.

WILLIAM R. H. CAPEWELL.

Witnesses:
T. M. MATLACK,
JOHN E. JENNINGS.

---

Copies of this patent may be obtained for five cents each, by addressing the "Commissioner of Patents, Washington, D. C."